Dec. 20, 1966 Y. M. HOAG 3,292,933

STABILIZER ARM FOR PHONOGRAPHS

Filed May 13, 1963

INVENTOR:
YATES M. HOAG,

BY Thomas A. Briody
HIS ATTORNEY.

United States Patent Office 3,292,933
Patented Dec. 20, 1966

3,292,933
STABILIZER ARM FOR PHONOGRAPHS
Yates Maxwell Hoag, Utica, N.Y., assignor to General Electric Company, a corporation of New York
Filed May 13, 1963, Ser. No. 279,968
6 Claims. (Cl. 274—10)

This invention relates to phonographs, and in particular to phonographs wherein a record player includes a stabilizing arm for balancing one or more unplayed records upon the spindle of a turntable.

In using a record player from time to time, there is often a degree of difficulty involved in accurately positioning records over the spindle of the turntable. For example, when the room wherein the phonograph is located is relatively dark, it is often far from easy for the average person to readily locate the central hole of the record and accurately position the spindle of the turntable therethrough. As another example, when relatively large records, such as twelve inch records are being used, the record itself often obscures the view of the spindle when the record is held at the normal altitude and position for placing it on the spindle. Accordingly, an important object of my invention is to provide an improved record player having a record positioner for readily and expeditiously aligning a record aperture with the spindle of a turntable.

Another object of my invention is to provide an improved record positioning device for a phonograph, which device is extremely simple in construction and economical to manufacture.

A further object of my invention is to provide a record player employing an improved stabilizing arm which is specially constructed so that it not only balances unplayed records, but also may be effectively utilized to position records in substantial alignment with the spindle of a turntable.

A still further object of my invention is to provide an improved record positioning device which involves a minimum number of parts and readily lends itself to a wide variety of phonograph applications.

In carrying out my invention, in one form thereof, I provide an improved record player having a record turntable and a record-centering spindle extending upwardly therefrom. The record player also employs an arm which is disposable above the turntable where it may be arranged to engage the top of a stack of records on the spindle, for stabilizing and balancing the records. With such an arrangement, by my invention, the record stabilizing arm includes a record positioning wall arranged on the arm in such a manner that it may be used to help locate records in substantially aligned relationship with the spindle and thus assures that the records will cooperate with the spindle in precise fashion. By including a record positioning wall on the record stabilizing arm of the record player, a simplified and effective means has thus been provided for readily locating the records into the desired axial alignment with the spindle.

Further aspects of my invention will become apparent hereinafter, and the specification concludes with claims particularly pointing out and claiming the subject matter which I regard as my invention. The invention, however, as to organization and method of operation, together with further objects and advantages thereof, may best be understood by reference to the following description when taken in conjunction with the accompany drawing, in which:

Figures 1, 2, 3:
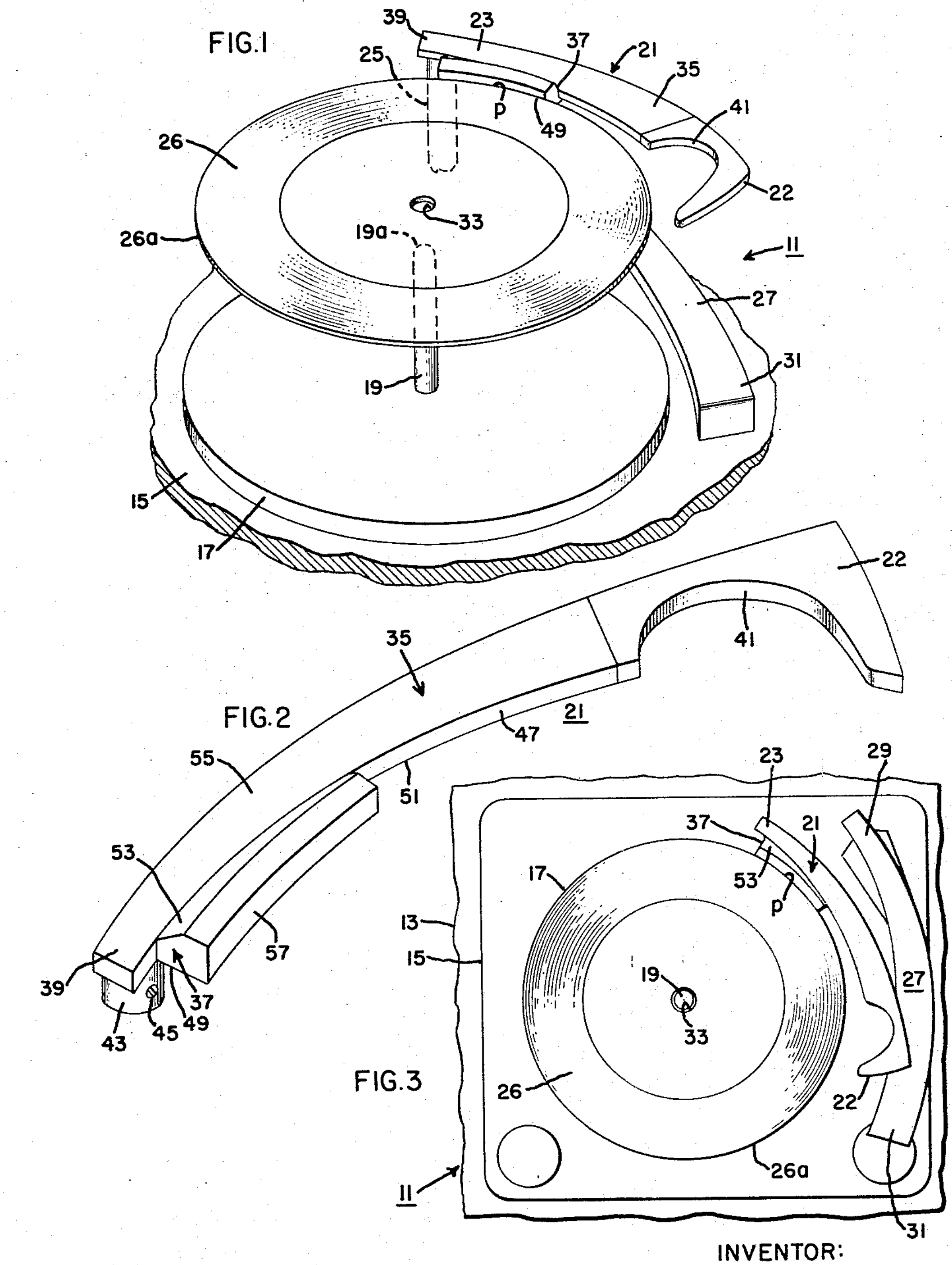
FIG. 1 is a fragmentary perspective view of a phonograph record player employing a preferred embodiment of my invention.
FIG. 2 is an enlarged perspective view of the record stabilizing arm of FIG. 1.
FIG. 3 is a top view of the record player, showing the tone arm and stabilizing arm at rest positions.

Referring first to FIGS. 1 and 3, as shown therein I have provided a record player 11 comprising a base 13, a record player frame 15 mounted on base 13, and a turntable 17 carried upon the frame 15. For centering records and positioning them in the desired relationship with turntable 17, a spindle 19 is extended upwardly from turntable 17 in the usual manner.

The record player 11 shown is an automatic record changer type, and employs a record balancing arm 21. The arm 21 is arranged in general parallel to the turntable 17, and it is carried by attachment of its rear end 23 to a vertical post member 25. Post member 25 is rotatably journalled and may be raised and lowered, in the usual fashion. The balancing arm 21 is thus arranged on the record player 11 so that it may be raised and lowered, and is swingable sideways from its raised position for loading records such as the record 26 upon the spindle 19. More particularly, for loading records on the spindle 19, the balancing arm 21 may be raised and swung angularly from a position wherein its free end 22 generally overlies the spindle 19 to a position wherein its free end is adjacent to but spaced outwardly from the periphery of a record which is to be loaded. The balancing arm 21 may then be located in a detented position such as is shown in FIGS. 1 and 3 to allow clearance for a record to be loaded upon spindle 19.

A tone arm 27 is located alongside of and above turntable 17, and is provided with a pivotal support near its rear end 29, in the well known manner. The arm 27 is pivotally supported so that vertical and horizontal movement is permitted and a pickup stylus or needle located at the front end 31 of the arm can engage and reproduce sound signals from the groove of a phonograph record 26 placed on the turntable 17.

With the record player arrangement thus far described, it has been found that there is a degree of difficulty sometimes involved in locating the center aperture 33 of a record 26 upon the spindle 19. More particularly in such circumstances as where the record player is located in a relatively dark room, or where the manual dexterity of the operator of the record player is minimal, difficulty may be encountered in readily centering the cylindrical aperture 33 of a record 26 upon the spindle 19. My invention substantially alleviates such difficulty, as shall now be described.

In accordance with the present invention, the record balancing arm 21 has an elongated and flat arcuate body 35, with a record positioning segment 37 integrally formed thereon near the supported end 39 of body 35. Near its free end 22, the arcuate body 35 of arm 21 has a curved recess 41 formed thereon. Recess 41 of arm 21 enables the adjacent bottom surfaces of the free end 22 of arm 21 to engage a record (which is to be automatically played) in partially surrounding adjacency to the aperture 33 of the record, while also allowing clearance for a 45 r.p.m spindle that may be placed on the spindle 19. On the underside of the supported end 39 of balancing arm 21 there is formed an integral upright sleeve 43 which includes an aperture (not shown) therein for receiving the upper end of post member 25 (viewing FIG. 1). The sleeve 43 may be secured to post member 25 by means of one or more set screws 45 which are threaded into engagement with sleeve 43 and impinge upon the member 25.

As shown best in FIG. 2, the record positioning segment 37 is integrally formed on the inner wall 47 of body 35, and it includes a lower elongated bottom 49 disposed in generally coplanar relationship with the bottom 51 of body 35, and a top 53 which is generally inclined upwardly from the plane of the top surface 55 of body 35 and is curved inwardly toward spindle 19 (i.e., when the arm 21 is in the position shown in FIG. 3). The outermost portion of top 53 of the record positioning segment 37 is turned into parallel relationship to the top surface 55 of body 35 of the arm (as shown in FIG. 2), and is then conterminous with a cylindrical inner wall 57.

In accordance with my invention, the cylindrical wall 57 of record positioning segment 37 has a radius of curvature substantially the same as the radius of curvature of the periphery 26*a* of a record 26 which is to be positioned for precise engagement with the spindle. For example, the radius of curvature of wall 57 for positioning a twelve diameter inch record would be approximately six inches. In addition, the axis of curvature of the cylindrical wall 57 is substantially coincident with the axis of the spindle 19 when the record balancing arm 21 is in the loading position shown in FIG. 1 and 3. With such an arrangement, when a record such as record 26 is to be loaded upon spindle 19, a cylindrical portion *p* of its periphery 26*a* is first positioned into contiguity with the outer surface of cylindrical wall 57, as shown in FIG. 1. The record 26 thereby may be conveniently positioned, as shown in FIG. 1, with its aperture 33 substantially aligned with and slightly above the cylindrically configured outer end 19*a* of the spindle 19. After the periphery 26*a* of the record has been engaged with arcuate wall 57 of the record positioning segment 37, the aperture 33 of the record 26, which is slightly larger in diameter than the outer diameter of spindle 19, is readily slipped into cooperation with the cylindrically configured outer end of the spindle. The record 26 is thereupon readily positioned on the spindle for playing purposes.

It will now, therefore be understood that in accordance with the present invention I have provided an improved record positioning device which is simplified in construction and efficient in operation. It will be further realized that my improved record positioner is effectively integrated into the record changer in such a manner that it involves a minimum expense and lends itself readily to a wide variety of phonograph applications.

While in accordance with the patent statutes, I have described what at present is considered to be the preferred embodiment of my invention, it will be obvious to those skilled in the art that various changes and modifications may be made therein without departing from my invention, and I, therefore, aim in the following claims to cover all such equivalent variations as fall within the true spirit and scope of this invention.

What I claim as new and desire to secure by Letters Patent of the United States is:

1. In a phonograph record playing apparatus including a turntable for receiving records, a spindle disposed on the turntable for positioning records upon said turntable, and a singular stabilizing arm located in proximity to said turntable and arranged to balance records into generally perpendicular relationship with said spindle, positioning means on said stabilizing arm for cooperation with a peripheral section of at least one record to locate said record into substantially aligned axial relationship with said spindle thereby to assure that said record will cooperate with said spindle in a precise manner.

2. The phonograph record playing apparatus of claim 1 wherein the positioning means includes a cylindrical wall having a radius of curvature approximating the radius of curvature of the periphery of a record which is to be positioned thereby.

3. The phonograph record playing apparatus of claim 2 wherein the axis of curvature of said cylindrical wall is coincident with the axis of said spindle when said stabilizing arm is arranged in a record loading position.

4. The phonograph record playing apparatus of claim 3 wherein said stabilizing arm is reciprocable and rotatable and said cylindrical wall is located near the axis of rotation of said stabilizing arm.

5. As an article of manufacture, a record stabilizing arm for a record player, said arm including an elongated body and an elongated record positioning means facing sideways from said body, said means including a segment having an outwardly facing cylindrical wall for cooperatively engaging the cylindrical periphery of a record when the stabilizing arm is mounted in a record player, thereby to help position said record on said player.

6. In a phonograph record playing apparatus including a turntable for receiving records, a spindle disposed on the turntable for positioning records upon said turntable and a singular stabilizing arm arranged in said apparatus in proximity to said turntable and spindle, said stabilizing arm being of relatively rigid material arranged to balance records into generally perpendicular relationship with said spindle, a segment integral to said stabilizing arm, said segment having a cylindrical wall for engaging and positioning at least one record into substantially aligned axial relationship with said spindle thereby to assure that said record will cooperate with said spindle in a precise manner.

References Cited by the Examiner

UNITED STATES PATENTS

| | | | |
|---|---|---|---|
| 1,349,611 | 8/1920 | Host | 274—1 |
| 1,455,355 | 5/1923 | Reinhold | 274—1 |
| 2,062,396 | 12/1936 | Carson | 274—10 |
| 2,485,575 | 10/1949 | Deaver | 274—14 X |
| 2,525,926 | 10/1950 | Matthews | 274—23 X |
| 3,081,094 | 3/1963 | Knopfle | 274—10 |
| 3,194,567 | 7/1965 | Conrad | 274—10 |
| 3,219,350 | 11/1965 | Geiger | 274—23 X |

FOREIGN PATENTS

| | | |
|---|---|---|
| 80,035 | 10/1955 | Denmark. |

NORTON ANSHER, *Primary Examiner.*

WILLIAM E. JACKSON, J. F. PETERS, *Assistant Examiners.*